TRANSISTOR AMPLIFIER FOR TELEPHONE INSTRUMENT

Filed June 11, 1954

INVENTOR
PHILIP N. LEHR
BY Campell, Brumbaugh, Free and Graves
HIS ATTORNEYS

United States Patent Office 2,842,623
Patented July 8, 1958

2,842,623

TRANSISTOR AMPLIFIER FOR TELEPHONE INSTRUMENT

Philip N. Lehr, Huntington, N. Y., assignor to Dictograph Products Company, Inc., Jamaica, N. Y., a corporation of Delaware Application June 11, 1954, Serial No. 436,192

11 Claims. (Cl. 179—81)

This invention relates generally to a supplemental amplifier for a telephone instrument and more particularly, to an amplifier of the above-noted character employing a transistor.

Conventional telephone instruments used in telephonic communication are designed to cope only with those telephonic conditions which are normal in the sense that they lie within the range of conditions whose occurrence may be frequently expected. Accordingly, telephonic conditions less favorable than what are commonly expected are accompanied by unsatisfactory performance on the part of such conventional instruments. For example, if the user of the telephone is hard-of-hearing, or if the signal is weak from the long distance transmission, the message intended to be conveyed by the telephone may become partially or completely unintelligible. At the same time, the described abnormal telephonic conditions are of such infrequency of occurrence as to not justify the replacement of a conventional telephone instrument by one of higher quality.

Recognizing the problem posed above, attempts have been made in the past to supplement conventional telephone instruments with auxiliary amplifier units selectively operable at the wish of the user to boost the output of the instrument. Such prior art amplifiers have, however, generally been attended by various disadvantages. For example, many of these amplifiers are inefficient and result in signal distortion in that they employ as a feature a sound wave coupling through an air path between the amplifier unit and the instrument. Others of such prior art amplifiers are undesirable in that they require a power supply, such as a battery, which wastefully duplicates the normal power supply furnished for the instrument and which is a source of annoyance in that it needs must be replaced at intervals. Still others of such amplifiers are unsatisfactory in that their form and bulk of construction requires an inconvenient and exposed location of the amplifier unit outside of the frame of the telephone instrument. Yet others of such prior art amplifiers are only adapted to the telephone instrument by extensive modification of the internal circuits thereof.

It is accordingly an object of this invention to provide, for a telephone instrument, a supplemental amplifier which is free of the disadvantages described above.

Another object of the present invention is to provide an amplifier of the above-noted character which is simple, compact, inexpensive and may be conveniently located within the frame of a conventional telephone instrument.

Yet another object of the invention is to provide an amplifier of the above-noted character which may be operated by the same power which operates the telephone instrument.

A further object of the invention is to provide an amplifier of the above-noted character adaptable to a telephone instrument with little change either in the circuit or the normal operation thereof.

A still further object of the invention is to provide an amplifier of the above-noted character which is operable with either incoming or outgoing telephonic signals.

These and other objects of the invention are attained by way of a transistor amplifier system adapted to be disposed within the frame of a telephone instrument having at least one electromechanical transducer unit interposed between a pair of conductors which are operable by conjoint action to supply power to the instrument and also to carry incoming and outgoing telephonic signals. It will be understood that these signals pass within the instrument through a first circuit section which bridges the two conductors. In accordance with the invention there is provided as an element of the amplifier system, an electrical signal transfer means for supplying the signals flowing in this first circuit section to the input or base electrode of the transistor. The transistor is accordingly excited by the signals to manifest the same in amplified form in a second circuit section which also bridges the pair of conductors by way of the collector and emitter electrodes of the transistor. This second circuit section is adapted to couple the amplified output signal of the transistor to at least one of the transducer units (receiver or transmitter) of the telephone instrument to increase the output signal of this transducer unit. Accordingly, the amplifier system for an "on" condition of an on-off switch means occasions a substantial boost in the output of the instrument.

For a better understanding of the invention reference is made to the following detailed description of an embodiment thereof, the description to be taken in conjunction with the accompanying drawings, wherein.

Figure 1:
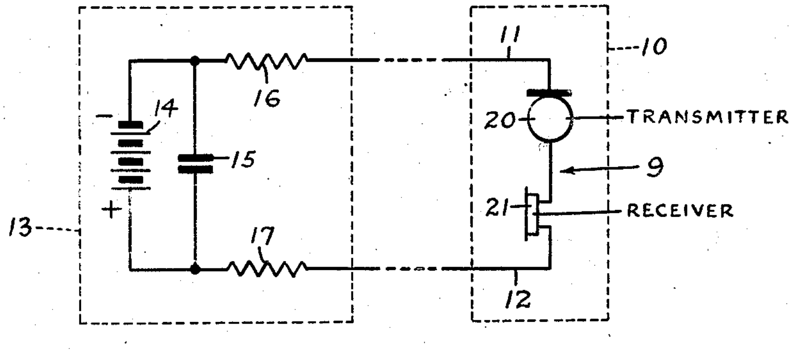
Fig. 1 is a schematic diagram of a conventional telephone instrument and the mode in which the same is furnished with power.

Referring now to Fig. 1, a conventional telephone instrument 9, whose frame is symbolically represented by the dotted line 10, contains within its frame a pair of conductors 11, 12, which communicate with a remote point represented as within the dotted line 13. Instrument 9 is supplied by way of conductors 11, 12 with power originating at remote point 13 from a direct current power supply, such as the 6 volt battery 14. For better telephonic performance, a filter circuit consisting of the capacitor 15 and resistors 16, 17 is interposed between battery 14 and instrument 9. Conductors 11 and 12, in addition to carrying power, also serve to carry telephonic signals (which are either incoming or outgoing with respect to instrument 9) between instrument 9 and the remote source 13.

In conjunction with these telephonic signals, the instrument 9, as shown in Fig. 1, includes two transducer units in the form of a telephone transmitter 20 and a telephone receiver 21. It will be understood, however, that the scope of the present invention extends to telephone instruments containing only one of such transducer units. As further shown in Fig. 1, the transmitter 20 and receiver 21 are serially coupled between the conductors 11 and 12. This serial coupling represents, for the embodiment of Fig. 1, a circuit section, denoted the first circuit section, which is defined for both the Fig. 1 and Fig. 2 embodiments as the portion of the internal circuit of instrument 9 which provides between conductors 11 and 12 a bridging path through which the unamplified telephonic signal flows.

Figure 2:
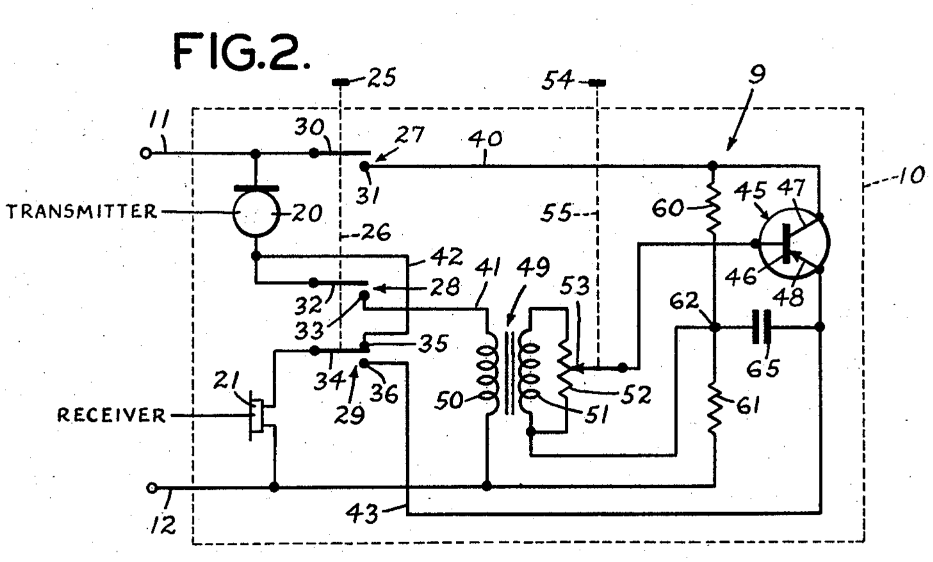
Fig. 2 is a schematic diagram of the telephone instrument of Fig. 1 modified to include a transistor amplifier system exemplary of the present invention.

Referring now to Fig. 2 which shows the telephone instrument 10 of Fig. 1 modified in accordance with the present invention, an actuating knob 25 disposed outside of the frame 10 of instrument 9 and forming a part of an on-off switch means is adapted under manual control to depress a switch actuating member represented by the dotted line 26. Actuating member 26, upon depression, is adapted to operate three switch sections 27, 28, 29 of which switch section 27 has a movable contact 30 and fixed contact 31, switch 28 has a movable contact 32 and a fixed contact 33, while switch section 29 has a movable contact 34 and two fixed contacts 35, 36. Actuating member 26 is mechanically coupled with the movable contacts 30, 32, 34, such that member 26, when undepressed, maintains switch sections 27, 28 in open position and also maintains switch section 29 in a position such that its movable contact closes with fixed contact 35. Depression of actuating member 26, however, causes closure of switch sections 27 and 28 accompanied by a change in position of switch section 29 such that its movable contact 34 opens with fixed contact 35 and closes with fixed contact 36.

The on-off switch means (formed, for example, by elements 25—36) is adapted to selectively couple and uncouple the conventional elements of telephone instrument 9 with additional elements hereafter described to institute and to interrupt, respectively, an amplifying action effected by these additional elements. To this end, in switch section 27 the movable contact 30 is connected to conductor 11, while the fixed contact 31 is connected to a lead 40 representing an extension of conductor 11, when switch section 27 is closed. Also, to this end, in switch section 28 the movable contact 32 is connected to the terminal of transmitter 20 which is conventionally connected (Fig. 1) to receiver 21 while the movable contact 33 is connected to a lead 41. Also to this end, in switch section 29 the movable contact 34 is connected to the terminal of receiver 21 which is conventionally connected (Fig. 1) to transmitter 20, the fixed contact 35 is connected via lead 42 to the mentioned terminal of transmitter 20, and the movable contact 36 is connected to a lead 43.

Considering now the components forming the transistor amplifier proper, a PNP junction transistor 45 with an input electrode in the form of a base electrode 46 and with output electrodes in the form of collector electrode 47 and emitter electrode 48, is connected by its output electrodes 47, 48 with, respectively, the leads 40 and 43. To furnish a telephonic signal input to base electrode 46, there is provided an electric signal transfer means in the form of a transformer 49 with a primary winding 50 and a secondary winding 51, the former winding being connected between lead 41 and conductor 12. Secondary winding 51 has associated therewith an adjustable means in the form of a resistor 52 shunted across the secondary and contacted by a tap 53 selectively positionable along the resistor. Tap 53 may be shifted in position by an actuator knob 54 disposed outside of the frame of instrument 9, knob 54 being adjustable in, say, angular position, to correspondingly set tap 53 through a mechanical coupling represented by dotted line 55. Tap 53 itself is connected to the base electrode 46 of transistor 45.

Proper biasing conditions for base electrode 46 are established by the employment of a voltage divider means in the form of resistors 60 and 61 serially connected in the order named between lead 40 and conductor 12. Resistors 60 and 61 may have respective values on the order of 2,000 ohms and 200 ohms when instrument 9 is furnished with 6 volt power. For power at another voltage, as, say, 48 volts, the relative resistance values of resistors 60, 61 may be adjusted to provide proper biasing voltage for the transistor at this new power voltage. The intermediate voltage at the junction 62 between resistors 60 and 61 is communicated to base electrode 46 by a connection of this junction to one of the terminals of secondary winding 51.

In operation the base electrode 46 of transistor 45 is excited by telephonic signals in the form of current flowing from secondary winding 51 through the base electrode and back to the secondary winding. To prevent this exciting current from having a degenerative feedback effect by passing through one or both of resistors 60, 61, a means providing a by-pass return path for exciting current is coupled between junction 62 and one of the transistor output electrodes. This by-pass means may take the form, as shown in Fig. 2, of a capacitor 65 of, say, 20 microfarad value connected between junction 62 and emitter electrode 48.

In view of the foregoing, it will be seen that normally (i. e., for an unoperated condition of actuator knob 25 with a corresponding undepressed position of actuating member 26) a first circuit section bridging the conductors 11 and 12 and carrying unamplified telephonic signals will be established through the path including transmitter 20, lead 42, fixed contact 35, movable contact 34 and receiver 21. The path described is equivalent to the simple serial coupling of transmitter 20 and receiver 21 shown in Fig. 1. Accordingly, under normal conditions the telephone instrument, as modified in accordance with the showing of Fig. 2, will operate in exactly the same manner as the unmodified telephone instrument of Fig. 1.

When, however, it is desired that the output of the Fig. 2 telephone instrument be increased, the user of this instrument pushes actuator knob 25 to cause, by depression of member 26, respective closures of switch sections 27, 28 and a shifting in position for switch section 29, such that movable contact 34 closes with fixed contact 36, instead of fixed contact 35. Switch section 27 by its closure completes a path for current flow through resistors 60, 61, and in addition, completes one section of a path for current flow through emitter electrode 48 and collector electrode 47 of transistor 45. Switch section 28, when closed, establishes a flow of telephonic signals through a path including conductor 11, transmitter 20, movable contact 32, fixed contact 33, primary winding 50 of transformer 49 and conductor 12. Thus, switch section 28, when closed, while maintaining the mentioned first circuit section (which, as defined, carries unamplified telephonic current in a path bridging conductors 11 and 12) in addition, couples the unamplified telephonic signals flowing in this first circuit section into operative relation with transformer 49. Switch section 29, when shifted in position, switches receiver 21 out of the described first circuit section by virtue of the opening of movable contact 34 with fixed contact 35. Also, switch section 29, when shifted in position, permits current flow between conductors 11 and 12 through a series coupling including receiver 21, movable contact 34, fixed contact 36, lead 43, emitter electrode 48, collector electrode 47, lead 40, fixed contact 31 and movable contact 30. This series coupling represents, for the embodiment of Fig. 2, a circuit section (denoted the second circuit section) which bridges conductors 11 and 12 and which, as later described, carries amplified telephonic signals. It will be noted that this second circuit section provides the means for energizing the transistor 45 with power from conductors 11 and 12. Also, as later more fully described, the second circuit section is also effective to couple the amplified output signal of the transistor with receiver 21 and/or with transmitter 20 to increase the respective output signals of one or both thereof.

By virtue of the described circuit changing actions of switch sections 27, 28, 29, the transistor amplifier of Fig. 2 is readied for amplification of incoming telephonic signals in that the current flow through resistors 60, 61 establishes proper biasing conditions for base electrode 46 and in that the transistor 45 itself is energized with power supplied to its output electrodes from conductors 11 and 12. An incoming telephonic signal received over conductors 11, 12 by the telephone instrument 9 flows through the primary winding 50 of transformer 49 by way of the first circuit section established, as described, by switch section 28 when closed. Transformer 49 which may be, say, a 350/1200 ohm miniaturized hearing-aid type of transformer is designed to match impedance between its primary winding and the input impedance of base electrode 46 to present an input impedance for primary winding 50 which is substantially the same as the input impedance for receiver 21. Accordingly, the presently described transistor amplifier, by maintaining the usual impedance balance between the transmitting and receiving circuit components of telephone instrument 9, enables an amplifying action to be obtained consonant with undisturbed operating conditions for the instrument.

The telephonic signal flowing in primary winding 50 induces, in secondary winding 51, a corresponding signal which appears across resistor 52. This signal is then supplied in a volume determined by the setting of tap 53 to the base electrode 46 of transistor 45. Base electrode 46 being so excited by the telephonic signal, the transistor 45 responsively reproduces the signal in amplified form by a variation in the current flowing through the path defined by its emitter electrode 48 and collector electrode 47. Since telephone receiver 21 is serially coupled with the transistor output electrodes, it will be seen that the amplified signal produced by the transistor will also manifest itself in terms of current flow through receiver 21. Accordingly, the normal action of the receiver is supplemented by the amplifying action of the transistor to afford a greatly increased audible output from the telephone instrument 9. In practice, it has been found that the performance of the telephone instrument may thus be improved by as much as 25 decibels.

In the case of outgoing signals, it will be noted that when switch sections 27, 28, 29 are in amplifying position, the electric signal developed by transmitter 20 is supplied to conductors 11 and 21 through a current path including the primary winding 50 of transformer 49. Thus, with actuator knob 25 pushed down, the transistor 45 serves to amplify not only incoming signals, but outgoing signals as well. The outgoing signals developed at the output of the transistor are fed via leads 40 and 43 to conductors 11 and 12 to supplement the signals directly supplied thereto from transmitter 20 through the primary of transformer 49. Thus, in terms of outgoing signals, the transistor amplifier is coupled in regenerative feedback relation with transmitter 20 to in effect increase the amount of outgoing signal developed thereby. The fraction of outgoing signal supplied by regenerative feedback is, however, sufficiently small in relation to the fraction of outgoing signal supplied by direct action of transmitter 20 to preclude the possibility of undesired oscillation being created by the regenerative feedback.

Of course, as dictated by the wishes of the user of the telephone instrument, the actuator knob 25 may be operated by him to obtain amplification for incoming signals only. It should be noted, however, that employment of the actuator knob 25 to obtain amplification for both incoming and outgoing signals affords a collateral advantage in that the outgoing signal is amplified not only for purposes of reception at a remote point, but is also amplified within telephone instrument 9 itself in the form of increased audibility of the transmitter developed signal as heard at receiver 21. This increased audibility is of value to provide a check on enunciation for a user of the telephone instrument who is hard-of-hearing.

In addition to the advantages hitherto mentioned, the present invention as exemplified by the embodiment of Fig. 2 is characterized by other advantages. For example, since in the amplifier of Fig. 2 the transistor element is itself of small size and since the other amplifier components are readily available in miniaturized form, the entire amplifier system may be conveniently located inside the frame of a conventional telephone instrument. The circuit of the amplifier system, since it involves a minimum number of components and connections, may be simply and inexpensively fabricated. Moreover, a conventional telephone instrument may be adapted with a minimum modification of its internal circuits for use with the described transistor amplifier. As a further advantage the transistor operates from the same power supply which operates the telephone instrument, the necessity for an extra and an unreliable power supply thus being avoided.

The embodiment of Fig. 2 represents a form of the invention which can be modified in a number of ways to fulfill particular requirements. For example, with regard to the on-off switch means, if it be desirable that the transistor amplifier operate continuously, the switch sections 27, 28 can be replaced by through connections and an additional through connection be used to replace switch section 29 in its position where movable contact 34 closes with fixed contact 36. Even when it is not desired to continuously operate the amplifier, the switch section 29, since it switches receiver 21 out of its coupling with transmitter 20 and into coupling with transistor 45, and since it also completes the power energizing circuit section for transistor 45 is sufficient alone, if desired, to selectively effect institution and interruption of the supplemental amplifier action. Accordingly, the switch section 27 may be replaced, if desired, by a through connection which provides continuous biasing current for the transistor, and/or the switch section 28 may be replaced by a through connection to form a continuous coupling for telephonic signals to the amplifier input. The switch section 27 need not occupy its presently shown position, but instead may occupy a lower position in Fig. 2 such that movable contact 30 is connected with conductor 12 and fixed contact 31 is connected with the lower terminal of primary winding 50. Note that with switch section 27 occupying this lower position as described, the switch section 27 not only fulfills its usual function of permitting and interrupting the flow of bias current for the transistor, but in addition, will perform the normal function of switch section 28 of opening and closing a current path for telephonic signals through the primary winding 50. Accordingly, where switch section 27 is in such lower position, the switch section 28 may be eliminated.

Continuing the consideration of variations from the form of the invention shown in Fig. 2, with regard to the transistor amplifier proper, the transistor 45, while hitherto described as a PNP transistor, may also be an NPN junction transistor. Also, transistor 45 while connected in Fig. 2 as a "grounded" emitter electrode amplifying stage, may also be utilized in "grounded" base electrode or "grounded" collector electrode amplifying stages to achieve the described supplemental amplifying action for the telephone instrument. Further, with regard to the transistor amplifier proper, if no volume control action is desired, the elements 52–55, inclusive, may be omitted.

Figure 3:
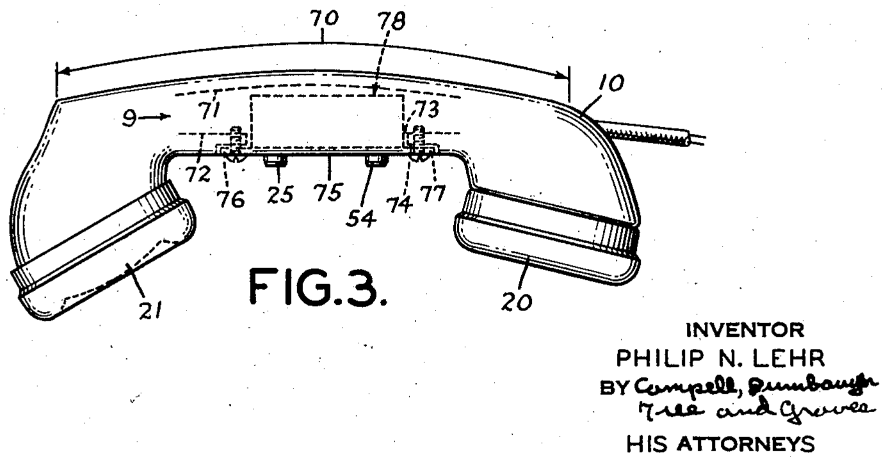
Fig. 3 is a structural view of a telephone handset incorporating the amplifier system of Fig. 2.

For an understanding of the structural aspects of the organization shown in Fig. 2, reference is made to Fig. 3. For the particular showing of this figure, the telephone instrument 9 (Figs. 1 and 2) takes the form of a telephone handset, the frame of which includes a yoke 70 which joins the transmitter half of the handset with the receiver half thereof. The yoke 70 itself is of hollow interior as indicated by the dotted lines 71, 72, representing a fragmentary length of the inside surface of the yoke. For mounting the transistor amplifier within the handset 9, the yoke 70 may be modified by cutting away a portion of the material thereof to form on the inner side of the yoke a rectangular aperture 73 together with a rectangular rabbet 74 which encompasses the aperture.

The rabbet 74 is adapted to receive a mounting plate 75 which forms a part of the frame of the transistor amplifier and which, in addition, performs the function of closing off the aperture 73 formed in yoke 70. Mounting plate 75 may be conveniently attached to yoke 70 by means of the set screws 76, 77.

The remainder of the transistor amplifier frame is constituted of a cover 78 attached to the mounting plate 75 to enclose the several components of the described amplifier system. Of these components, the on-off actuator knob 25 (Fig. 2) and the volume control actuator knob (Fig. 2) are as shown in Fig. 3, mounted to project exteriorly of yoke 70 to provide for convenient manual operation thereof by the user of the telephone instrument 9. Accordingly, the transistor amplifier may be operated or not with selective volume control entirely at the discretion of the user.

It will be understood that the disclosure herein relates only to a particular embodiment of the present invention, and that the present invention, within its proper scope, is susceptible to numerous changes in form and detail. Accordingly, the present invention is not to be considered as limited save as set forth by the following claims.

I claim:

1. An amplifier system adapted to be disposed within the frame of a telephone instrument having at least a receiver and a pair of conductors operable by conjoint action to supply power to said instrument and also to carry telephonic signals to said receiver from a remote point, said signals flowing in said instrument in unamplified form through a first circuit section bridging said conductors, said system comprising, a transistor having a base electrode as an input and collector and emitter electrodes as an output, electrical signal transfer means for coupling said base electrode in signal receiving relation with said first circuit section to provide excitation of said transistor by said signals, a second circuit section adapted to carry current from one conductor through said transistor output to the other conductor, said second circuit section being adapted to energize said transistor with power, and said second circuit section being operably adapted to couple the output signal of said transistor in series with said receiver to increase the output signal thereof, and on-off switch means for selectively instituting and interrupting the operation of said transistor as an amplifier.

2. An amplifier system adapted to be disposed within the frame of a telephone instrument having at least a transmitter and a pair of conductors operable by conjoint action to supply power to said instrument and also to carry telephonic signals developed by said transmitter to a remote point, said transmitter signals being fed to said conductors in unamplified form by a first circuit section providing between said conductors a bridging path including said transmitter, said system comprising, a transistor having a base electrode as an input and collector and emitter electrodes as an output, electrical signal transfer means for coupling said base electrode in signal receiving relation with said first circuit section to provide excitation of said transistor by said signals, a second circuit section adapted to carry current from one conductor through said transistor output to the other conductor, said circuit section being adapted to energize said transistor with power, and said second circuit section being operably adapted to couple the output signal of said conductors to said transmitter to increase the output signal impressed on said conductors by said transmitter, and on-off switch means for selectively instituting and interrupting the operation of said transistor as an amplifier.

3. An amplifier system adapted to be disposed within the yoke of a telephone handset having a receiver, a transmitter and a pair of conductors operable by conjoint action to supply power to said handset and also to carry telephonic signals between said handset and a remote point, said signals flowing in said instrument in unamplified form through a first circuit section providing between said conductors a bridging path which includes said transmitter, said system comprising, a transistor having a base electrode as an input and collector and emitter electrodes as an output, electric signal transfer means for coupling said base electrode in signal receiving relation with said first circuit section to provide excitation of said transistor by said signals, a second circuit section including said receiver and adapted to carry current from one conductor through said transistor output to the other conductor, said second circuit section being adapted to energize said transistor with power, and said second circuit section being operably adapted to couple the output signal of said transistor both in series with said receiver and to said conductors to increase the respective output signals which are impressed on said receiver and which are impressed on said conductors by said transmitter, and on-off switch means for selectively instituting and interrupting the operation of said transistor as an amplifier.

4. An amplifier system adapted to be disposed within the frame of a telephone instrument having at least a receiver and a pair of conductors operable by conjoint action to supply power to said instrument and also to carry telephonic signals to said receiver from a remote point, said receiver for conventional telephone operation being coupled in a first circuit section carrying unamplified signals and bridging said conductors, said system comprising, a transistor having a base electrode as an input, collector and emitter electrodes as an output, a signal transfer means having an input and an output, the latter being coupled in signal transmitting relation to said base electrode, a second circuit section adapted to carry current from one conductor through said transistor output to the other conductor, said second circuit section being thereby adapted to energize said transistor with power, and selectively operable switch means adapted when actuated both to couple said input of said signal transfer means in signal receiving relation with said first circuit section and to switch said receiver out of said first circuit section into a serial coupling with said transistor output in said second circuit section said switch means when actuated enabling said transistor to amplify incoming signals for said receiver.

5. An amplifier system adapted to be disposed within the yoke of a telephone handset having a receiver, a transmitter and a pair of conductors operable by conjoint action to supply power to said handset and also to carry telephonic signals between said handset and a remote point, said transmitter and receiver for conventional telephone operation being serially coupled in a first circuit section carrying unamplified signals and bridging said conductors, said system comprising, a transistor having a base electrode as an input and collector and emitter electrodes as an output, a signal transfer means having an input and an output, the latter being coupled in signal transmitting relation to said base electrode, a second circuit section adapted to carry current from one conductor through said transistor output to the other conductor, said second circuit section being thereby adapted to energize said transistor with power, and selectively operable switch means adapted when actuated both to couple said input of said signal transfer means in signal receiving relation with said first circuit section and to switch said receiver out of said first circuit section into a serial coupling with said transistor output in said second circuit section, said switch means when actuated enabling said transistor to amplify incoming signals for said receiver and to supplement by regenerative feedback the outgoing signals developed by said transmitter.

6. An amplifier system adapted to be disposed within the yoke of a telephone handset having a receiver, a transmitter and a pair of conductors operable by conjoint action to supply power to said handset and also to carry telephonic signals between said handset and a remote point, said receiver and transmitter for conventional telephone operation being serially coupled in a circuit section carrying unamplified signals and bridging said conductors, said system comprising, a transistor having a base electrode as an input and collector and emitter electrodes as an output, transformer means having a primary and a secondary, the latter being coupled in signal transmitting relation to said base electrode, voltage divider means operatively interposed between said conductors for supplying a biasing voltage to said base electrode, capacitor means coupled between said secondary and one of the transistor output electrodes to provide a by-pass return path for signal current exciting said base electrode, and selectively operable switch means adapted when actuated both to switch said transformer primary into said circuit section and to switch said receiver out of said circuit section into series with said transistor output in a series connection carrying amplified signals and bridging said conductors.

7. An amplifier system as in claim 6 wherein said transformer matches impedance between its primary and the input impedance of said base electrode to present an input impedance for its primary substantially the same as the input impedance for said receiver.

8. An amplifier system as in claim 6 further characterized by adjustable means responsive to adjustment to vary the degree to which said telephonic signals are amplified by said transistor.

9. An amplifier system as in claim 6 wherein said switch means comprises, a first switch section having one contact connected in said circuit section to the side of the transmitter near to said receiver and another contact connected to one side of said transformer primary, a second switch section having a movable contact connected to the side of said receiver near to said transmitter and a pair of fixed contacts of which the first is connected to said side of said transmitter and of which the second is connected to one of said transistor output electrodes, and a member adapted when actuated both to close together the contacts of said first switch section and to shift the movable contact of second switch section from closure with said first contact to closure with said second contact.

10. An amplifier system as in claim 6 further characterized by additional switch means interposed between one of said conductors and the series connection of said resistor and transmitter, said additional switch means being selectively operable to open and closed circuit positions to accordingly interrupt and institute current flow from said conductors through said serial connection.

11. An amplifier system adapted to be disposed within the yoke of a telephone handset having first and second conductors operable by conjoint action to supply power to said handset and also to carry telephonic signals between said handset and a remote point, said handset including a transmitter with first and second terminals of which the former is connected to said first conductor, said handset also including a receiver with first and second terminals of which the latter is connected to said second conductor, said system comprising, a transistor having a base electrode as an input electrode and collector and emitter electrodes as output electrodes, a first of said output electrodes being operatively connected with said first conductor, a plurality of resistors operatively connected in series between said conductors, a transformer having a primary connected by one terminal to said second conductor and a secondary connected by one terminal to the junction between two resistors in said plurality thereof, a capacitor connected between said junction and one of said output electrodes, electrical means coupling the other terminal of said secondary with said base electrode, a first normally open switch section adapted when closed to couple the other terminal of said transformer primary with the second terminal of said transmitter, a second switch section adapted in a first position to connect the first terminal of said receiver with the second terminal of said transmitter and in a second position to connect the first terminal of said receiver with the second of said output electrodes, said second switch section being normally maintained in its first position, and a switch actuating member adapted when actuated to close said first switch section and to shift said second switch section from its first to its second position.

References Cited in the file of this patent

UNITED STATES PATENTS

| | | |
|---|---|---|
| 1,830,035 | Loeffler | Nov. 3, 1931 |
| 2,142,993 | Brown | Jan. 10, 1939 |
| 2,298,207 | Gent | Oct. 6, 1942 |
| 2,385,265 | Foley et al. | Sept. 18, 1945 |
| 2,762,867 | Meacham | Sept. 11, 1956 |